Feb. 2, 1954  R. LUCIEN  2,667,947
WHEEL EQUIPPED WITH DISK BRAKE
Filed Jan. 3, 1951  2 Sheets-Sheet 1
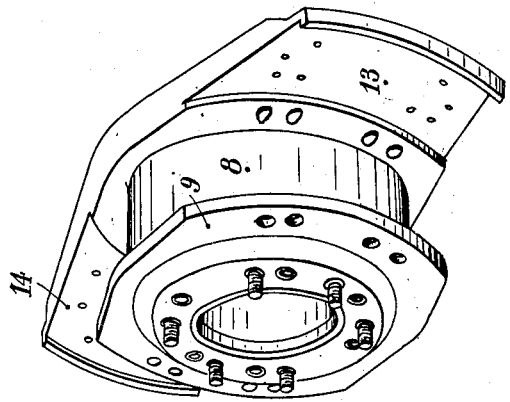
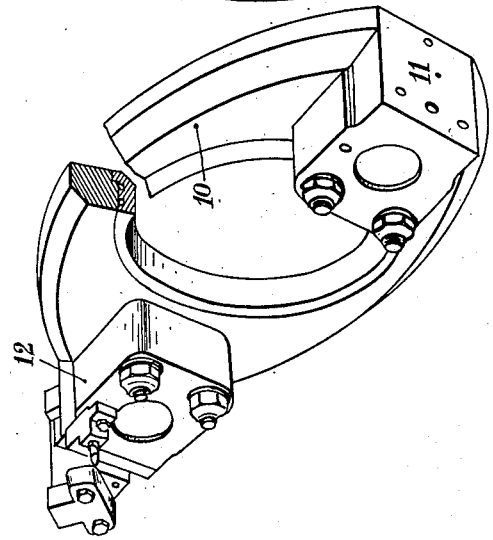
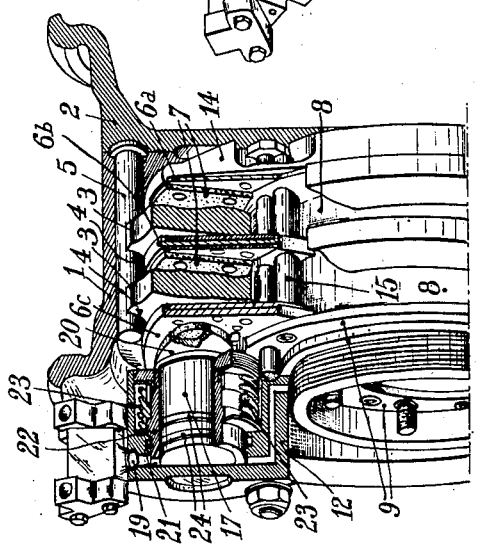
INVENTOR
RENE LUCIEN
BY Haseltine, Lake + Co.,
AGENTS Feb. 2, 1954 R. LUCIEN 2,667,947
WHEEL EQUIPPED WITH DISK BRAKE
Filed Jan. 3, 1951 2 Sheets-Sheet 2

INVENTOR
RENE LUCIEN
BY Haseltine, Lake & Co.
AGENTS

Patented Feb. 2, 1954

2,667,947

UNITED STATES PATENT OFFICE 2,667,947

WHEEL EQUIPPED WITH DISK BRAKE

René Lucien, Paris, France, assignor to Societe d'Inventions Aeronautiques et Mecaniques S. I. A. M., Geneva, Switzerland, a corporation of Switzerland Application January 3, 1951, Serial No. 204,198

Claims priority, application France June 7, 1950

2 Claims. (Cl. 188—152)

My invention relates to such wheels as are equipped with so-called disc brakes and more particularly to wheels of the said kind in which the braking effect is secured by a squeezing action exerted upon one or several discs rotationally rigid with the movable portion of the wheel by means of one or several axially movable brake shoes or segments cooperating with a greater or less, anyhow limited portion of the discs.

One is aware that generally in disc brakes the advantage of such an arrangement is that owing to most of the disc surfaces being exposed to the atmosphere the heat accumulated in said discs during the braking process and by which they may sometimes be brought to red heat can be dissipated rapidly by radiation as well as by conduction.

The purpose of my invention is to remove that portion of the wheel in which the bearing is housed and by the way the lubricant providing for a satisfactory working of the bearing from the influence of the heat thus radiated by the discs.

My invention is characterized thereby that the fixed portion of the brake, i. e. the one which carries and guides the brake segments, comprises a barrel providing a heat shield surrounding the housing of the antifriction bearing and keeping the latter together with the lubricant safe from the detrimental action of the radiant heat consequent to the braking process.

In a particular embodiment of my invention given by way of example, the said shield is rigid on its one side with a flange to which a plate is secured which carries the brake-actuating means (generally liquid-operated pistons working in cylinders) and on its opposite side with plates against which the whole segment and disc system is pressed during the braking process and by which said actuating means are backed in their respective actions.

A disc brake embodying the features of my invention is illustrated in perspective view in the sheets of drawings appended hereto, in which—

Figures 1 and 2 respectively show the fixed section of the brake without its segmental linings and the brake section which carries the liquid-operated actuating members.

Figure 4 illustrates the wear take-up device.

Figure 3:
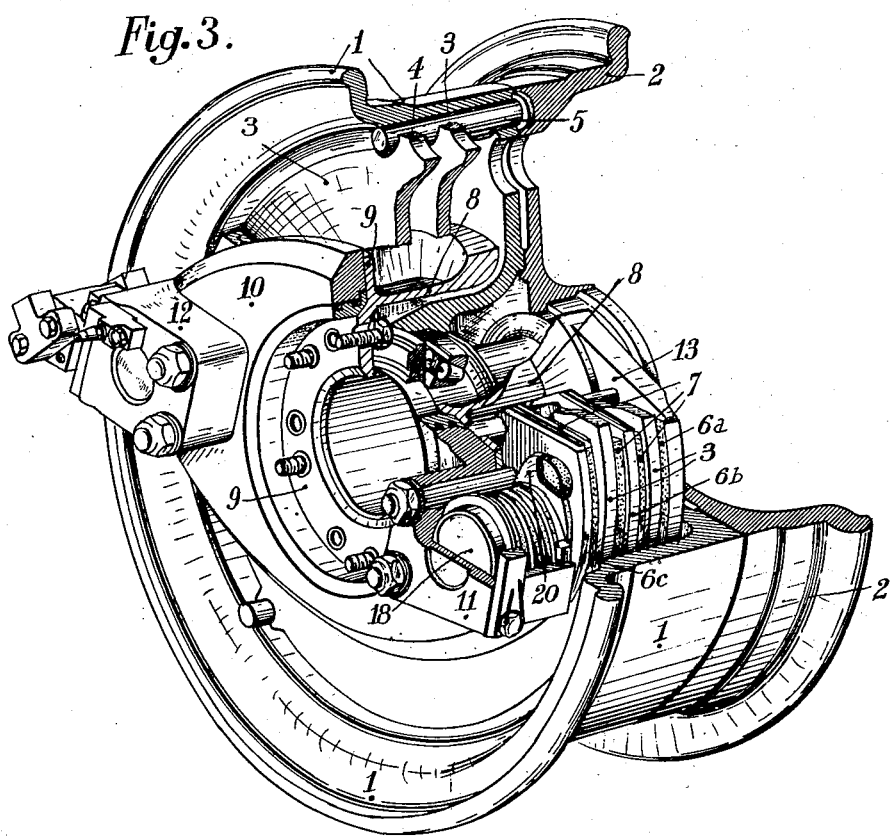
Figure 3 is a partly sectional perspective view of my disc brake as mounted on a wheel.

Shown in the various figures of the drawings are the well known parts of every wheel of the kind considered, i. e. the rotatable section which comprises on the one hand the wheel body which here is composed of a pair of unequal annular shells 1, 2, made e. g. of any suitable light alloy and provided with hub portions rigid with the outer races of antifriction bearings in which an axle (not shown) is journaled and on the other hand brake discs 3, 3 which are made peripherally rigid with the aid of peripheral notches 4, 4 milled therein and cooperating with stop bars 5 fitted in said shells 1, 2. In the braking process the said discs cooperate with paired braking segments 6a, 6b, 6c which are provided with friction linings 7 vigorously pressed into contact with the discs during the braking process.

According to the main feature of my invention the fixed section of the brake is formed with a sleeve 8 which completely surrounds the antifriction bearings and by which consequently the same are shielded together with the accompanying lubricant against the heat radiated by the braking disc-and-segment system.

The said shield sleeve is provided at its one end with a flange 9 to which a plate 10 is secured which carries the brake-actuating means (here a pair of hydraulic power relays 11, 12) and at its other end with a pair of back brake lining supports 13, 14 located each opposite one of said power relays.

The back segmental brake linings 6a are rigid with the said supports 13, 14 while the intermediate brake lining segments 6b and the front brake lining segments 6c are guided in their axial displacements on fixed bars 15 by which they are retained from partaking of the rotation during the braking process.

Each hydraulic power relay comprises a fixed cylinder in which a piston 17 or 18 is slidably received upon the front end face of which the pressure of a liquid, supplied through a duct 19, is exerted while the back end of said piston is rigid with an equalizer plate 20 through which the hydraulic pressure is transmitted from the piston to the front segment 6c and the pack of brake discs and linings behind the same.

As shown in Fig. 4, each power relay 17, 18 is equipped with brake-releasing means which consist of a sleeve 21 slidably mounted on and coaxial with the related piston, which sleeve is formed at its front end with a flange 22 which provides a rest for a spring 23 coiled about said sleeve.

As the brake is applied by letting in pressure liquid through the duct 19 the sleeve 21 which is forced backwards together with the related brake-actuating piston will compress the said spring 23. As the pressure is released in order to disengage the brake discs and linings from one another the sleeve 21 will be brought back to its position of rest by said spring 23 and will in turn restore the brake-actuating piston to its inoperative position owing to the provision on said piston of a suitable number of friction rings 24.

I claim:

1. A vehicle wheel having a brake of the disc type comprising: a rotatable wheel body, a series of annular friction discs rotatable unitarily with the wheel body and axially movable relatively thereto; at least one group of non-rotatable brake shoes having brake linings and being arranged alternately with the discs and each engaging a relatively reduced area of the discs; a stationary brake structure comprising a cylindrical sleeve co-axial with the bearings of the wheel and positioned between the discs and shoes and the bearings and surrounding the latter throughout the axial length thereof; a flange extending radially from the sleeve at one end thereof; a support plate secured to the flange; a brake-actuating power relay mounted on the support plate in axial alignment with the group of brake shoes and comprising a cylinder having a closed end and a piston slidable in the cylinder in response to the supply of fluid under pressure to the interior of the cylinder; and a brake backing plate rigidly secured to the other end of the sleeve in alignment with the power relay and having a brake lining thereon; the piston being fixed at its end opposite the closed end of the cylinder to the adjacent one of the non-rotatable brake shoes.

2. A vehicle wheel as in claim 1 comprising a plurality of groups of brake shoes distributed circumferentially around the wheel body, each having a support plate, a power relay and a backing plate in alignment therewith.

RENÉ LUCIEN.

References Cited in the file of this patent

UNITED STATES PATENTS

| Number | Name | Date |
|---|---|---|
| 2,082,277 | Dierfield | June 1, 1937 |
| 2,349,928 | Ash | May 30, 1944 |
| 2,358,740 | Scott-Iversen | Sept. 19, 1944 |
| 2,453,237 | Le Tourneau | Nov. 9, 1948 |
| 2,483,362 | Du Bois et al. | Sept. 27, 1949 |
| 2,496,699 | Clark | Feb. 7, 1950 |
| 2,541,031 | Butler | Feb. 13, 1951 |